US012215970B1

(12) United States Patent
Saeed et al.

(10) Patent No.: US 12,215,970 B1
(45) Date of Patent: Feb. 4, 2025

(54) SYSTEM FOR MEASURING ANGLE OF REPOSE OF HIGH TEMPERATURE GRANULAR MATERIAL

(71) Applicant: KING SAUD UNIVERSITY, Riyadh (SA)

(72) Inventors: Rageh Saadallah Ali Saeed, Riyadh (SA); Shaker Saeed Abdullah Alaqel, Riyadh (SA); Nader Shaif Saleh, Riyadh (SA); Eldwin Djajadiwinata, Riyadh (SA); Hany Abdurrahman Al-Ansary, Riyadh (SA); Sheldon Jeter, Riyadh (SA); Saeed Mohammed Alzahrani, Riyadh (SA); Zeyad Abdulrahman Alsuhaibani, Riyadh (SA); Zeyad Ammar Almutairi, Riyadh (SA); Syed Noman Danish, Riyadh (SA); Abdelrahman Mahmoud Elleathy, Riyadh (SA); Abdulelah Ibrahim Alswaiyd, Riyadh (SA)

(73) Assignee: KING SAUD UNIVERSITY, Riyadh (SA)

(*) Notice: Subject to any disclaimer, the term of this patent is extended or adjusted under 35 U.S.C. 154(b) by 0 days.

(21) Appl. No.: 18/679,142

(22) Filed: May 30, 2024

(51) Int. Cl.
*G01B 11/26* (2006.01)

(52) U.S. Cl.
CPC .................... *G01B 11/26* (2013.01)

(58) Field of Classification Search
CPC ............ C08K 5/103; C08K 5/526; C08K 2003/2296; C08K 2201/011; C08K 3/22;
(Continued)

(56) References Cited

U.S. PATENT DOCUMENTS 6,158,293 A    12/2000   Poole
7,615,098 B2   11/2009   Brent et al.
(Continued)

FOREIGN PATENT DOCUMENTS

CN    101126727 A    2/2008
CN    212300600 U    1/2021
(Continued)

OTHER PUBLICATIONS

Hamzah M. Beakawi Al-Hashemi, Al-Hashemi et al., "A review on the angle of repose of granular materials", Powder Technology, vol. 330, 2018, pp. 397-417.
(Continued)

*Primary Examiner* — Masum Billah
(74) *Attorney, Agent, or Firm* — Nath, Goldberg & Meyer; Joshua B. Goldberg

(57) ABSTRACT

The system for measuring the angle of repose of high temperature granular material includes a hollow chamber with an optically transparent window. A cylindrical receptacle is rotatably mounted within the hollow chamber, with an open end thereof releasably covered by an optically transparent plate. The cylindrical receptacle is oriented with respect to the hollow chamber such that the optically transparent plate faces, and is aligned with, the optically transparent window. The cylindrical receptacle is controllably rotated within the hollow chamber. The temperature within the hollow chamber may be selectively adjusted by one or more heating elements mounted therein. A camera detects the angle of repose of granular material in the cylindrical receptacle when the cylindrical receptacle is rotated within the hollow chamber. The camera is positioned such that the granular material may be viewed thereby through the optically transparent plate and the optically transparent window.

8 Claims, 4 Drawing Sheets

(58) Field of Classification Search
CPC ...... C08K 3/40; C08K 5/0033; C08K 5/3475; C08K 5/3492; H04N 21/2187
USPC ........................................................ 348/135
See application file for complete search history.

(56) References Cited

U.S. PATENT DOCUMENTS

| | | |
|---|---|---|
| 10,088,402 B2 | 10/2018 | Nishimura et al. |
| 11,312,648 B2 | 4/2022 | Turner et al. |
| 2015/0153292 A1* | 6/2015 | Nishimura ............... G01N 5/00 374/12 |
| 2017/0236949 A1* | 8/2017 | Yamazaki ......... H01L 29/78648 257/43 |
| 2020/0015409 A1* | 1/2020 | de Bruin ................ H04N 23/66 |

FOREIGN PATENT DOCUMENTS

| | | |
|---|---|---|
| IN | 1525CHE2014 A | 11/2015 |
| JP | 4155942 B2 | 9/2008 |
| SU | 451940 A1 | 11/1974 |

OTHER PUBLICATIONS

He, M. et al. "Determination of the repose angle of stuff in rotary kiln based on imaging processing." 2009 9th International Conference on Electronic Measurement & Instruments (2009): 4-97-4-101.

* cited by examiner

SYSTEM FOR MEASURING ANGLE OF REPOSE OF HIGH TEMPERATURE GRANULAR MATERIAL

BACKGROUND

Field

The disclosure of the present patent application relates to measurement and testing, and particularly to a system for measuring the angle of repose of granular material at high temperatures.

Description of Related Art

The angle of repose of a granular material is the steepest angle of descent or dip relative to the horizontal plane on which the material can be piled without slumping. At this angle, the material on the slope face is on the verge of sliding. The angle of repose can range from 0° to 90°. The morphology of the material affects the angle of repose. For example, smooth rounded sand grains cannot be piled as steeply as can rough interlocking sands. The angle of repose can also be affected by additions of solvents. If a small amount of water, for example, is able to bridge the gaps between particles, electrostatic attraction of the water to mineral surfaces increases the angle of repose.

When bulk granular materials are poured onto a horizontal surface, a conical pile forms. The internal angle between the surface of the pile and the horizontal surface is the angle of repose. The angle of repose is dependent on the density, surface area and shapes of the particles, as well as the coefficient of friction of the material. Material with a low angle of repose forms flatter piles than material with a high angle of repose.

The angle of repose may be measured by a number of different techniques. The "tilting box" method, for example, is appropriate for fine-grained, non-cohesive materials with individual particle sizes of less than 10 mm. In the tilting box method, the material is placed within a box with a transparent side to observe the granular test material. The granular test material is initially level and parallel to the base of the box. The box is slowly tilted until the material begins to slide in bulk and the angle of the tilt is measured.

Another common technique is the "fixed funnel" method. In this method, the material is poured through a funnel to form a cone. The tip of the funnel is held close to the growing cone and is slowly raised as the pile grows in order to minimize the impact of falling particles. The pouring is stopped when the pile reaches a predetermined height or the base reaches a predetermined width. Rather than attempt to measure the angle of the resulting cone directly, the height is typically divided by half the width of the base of the cone. The inverse tangent of this ratio is the angle of repose.

The "revolving cylinder" method is also a commonly used technique. In this method, the material is placed within a cylinder with at least one transparent end. The cylinder is rotated at a fixed speed and the observer watches the material moving within the rotating cylinder. The effect is similar to watching clothes tumble over one another in a slowly rotating clothes dryer. The granular material assumes a certain angle as it flows within the rotating cylinder. This method is recommended for obtaining the dynamic angle of repose and may vary from the static angle of repose measured by other methods.

As noted above, the revolving cylinder method is used to determine the dynamic angle of repose, which is in contrast to the determination of the static angle of repose measured by the tilting box and fixed funnel methods. When the static angle of repose is exceeded in a granular material, the granular material avalanches and halts at the dynamic angle of repose. The measurement of the dynamic angle of repose for solid particles at high temperatures is considered a crucial factor in the design of Concentrated Solar Power (CSP) tower systems that rely on storing thermal energy in particles. The movement of particles within many components of such systems depends on gravity, including hoppers, particle receivers, chutes, thermal storage bins and heat exchangers. Thus, the design of these components heavily relies on the dynamic angle of repose of particles to ensure proper flow and prevent issues related to particle flow, such as blockages or segregation. This enhances the performance and reliability of these components within the system.

By measuring and considering the dynamic angle of repose, industrial processes can be optimized to improve efficiency, facilitate smooth material flow, enhance product quality and improve overall operational performance. Additionally, incorporating this understanding into industrial operations helps ensure the safety of personnel and minimizes the risk of accidents or hazardous events. With regard to equipment design and sizing, the dynamic angle of repose at high temperatures provides valuable information for designing equipment such as hoppers, chutes, particle conveyors and thermal storage bins. The design of these components is essential to accommodate the flow and storage of particles at elevated temperatures without issues such as clogging, bridging, or particle segregation. Measuring the dynamic angle of repose helps determine the equipment dimensions, angles, and other specifications necessary to ensure efficient particle flow and prevent system disruptions.

With regard to heat transfer efficiency, in particle-based Concentrated Solar Power (CSP) systems, solid particles are often used as heat transfer and storage media. In these systems, the temperature can reach elevated values, typically on the order of 1000° C. With such high temperatures, measuring the dynamic angle of repose becomes critical in optimizing the design of heat exchangers and receivers. By understanding the behavior of particles and their stability at elevated temperatures, the heat transfer surfaces can be appropriately sized and positioned to maximize thermal efficiency and ensure effective heat exchange between the particles and the working fluid (e.g., air, steam, supercritical $CO_2$, etc.).

Additionally, measurement of the dynamic angle of repose is important for maintaining material compatibility between system facilities and candidate particulates. High temperatures can significantly affect the properties of solid particles, including their thermal expansion, melting point, and chemical reactivity. Knowing the dynamic angle of repose at elevated temperatures helps in selecting suitable particle materials that can withstand the desirable operating conditions without undergoing prejudicious changes or degradation. This ensures the compatibility of the chosen materials with the facility's design, preventing issues such as material deterioration, erosion, or unwanted reactions between the particles and system components that could impact system performance and its lifetime.

In addition to the above, safety is crucial when designing system facilities, especially when dealing with solid particles at high temperatures. Measuring the dynamic angle of repose provides valuable insights into particle behavior, including the risk of particle avalanches, spills, or other hazardous events. This knowledge plays a crucial role in designing facilities that incorporate containment systems, safety measures, and structural reinforcements. These measures are enforced to prevent accidents, safeguard personnel, and ensure the overall integrity of the facility. By addressing safety considerations through the understanding of particle behavior, CSP facilities can be designed to minimize risks and create a secure working environment.

The basic revolving cylinder method, as described above, is commonly used to determine the dynamic angle of repose but, on its own, is ineffective for determining the dynamic angle of repose at high temperatures. Given the importance of making such measurements, a system for measuring the angle of repose of high temperature granular material solving the aforementioned problems is desired.

SUMMARY

The system for measuring the angle of repose of high temperature granular material includes a hollow chamber having at least one sidewall with an optically transparent window mounted therein. A cylindrical receptacle is rotatably mounted within the hollow chamber. The cylindrical receptacle has opposed open and closed ends, with the open end thereof being releasably covered by an optically transparent plate. The cylindrical receptacle is adapted for receiving a volume of granular material and the cylindrical receptacle is oriented with respect to the hollow chamber such that the optically transparent plate faces, and is aligned with, the optically transparent window. The open end of the cylindrical receptacle may be releasably sealed by a cap, with the optically transparent plate mounted in the cap.

The cylindrical receptacle is controllably rotated within the hollow chamber by a motor or the like. The motor may be mounted external to the hollow chamber. An axle may be coupled to the motor and the closed end of the cylindrical receptacle such that driven rotation of the axle by the motor drives rotation of the cylindrical receptacle. The axle may pass through the at least one sidewall of the hollow chamber.

The temperature within the hollow chamber may be selectively adjusted by one or more heating elements mounted therein. As a non-limiting example, the one or more heating elements may be of the type commonly found in laboratory furnaces. A temperature sensor, such as a thermocouple or the like, may be provided for measuring the temperature within the hollow chamber. Additionally, a rotational sensor, such as a non-contact tachometer or the like, may be provided for measuring the rotational speed of the cylindrical receptacle. As a non-limiting example, a reflective marker or the like may be fixed to the axle and the non-contact tachometer may, by measuring the frequency of detection of reflected light therefrom, determine the rotational speed of the axle and the cylindrical receptacle.

A camera is mounted external to the hollow chamber for detecting the angle of repose of the granular material when the cylindrical receptacle is rotated within the hollow chamber. The camera is positioned such that the granular material may be viewed thereby through the optically transparent plate and the optically transparent window.

The motor, camera, temperature sensor, rotational sensor and the one or more heating elements may each be in communication with a controller, allowing the user to control the operation and speed of the motor (with or without automatic feedback-based control based on the measurements provided by the rotational sensor) and allowing the user to control the temperature within the hollow chamber (with or without automatic feedback-based control based on the measurements provided by the temperature sensor). The controller also receives and records the visual output from the camera, allowing the angle of repose of the granular material to be visually determined.

These and other features of the present subject matter will become readily apparent upon further review of the following specification.

BRIEF DESCRIPTION OF DRAWINGS

Similar reference characters denote corresponding features consistently throughout the attached drawings.

DETAILED DESCRIPTION

Figure 1A:
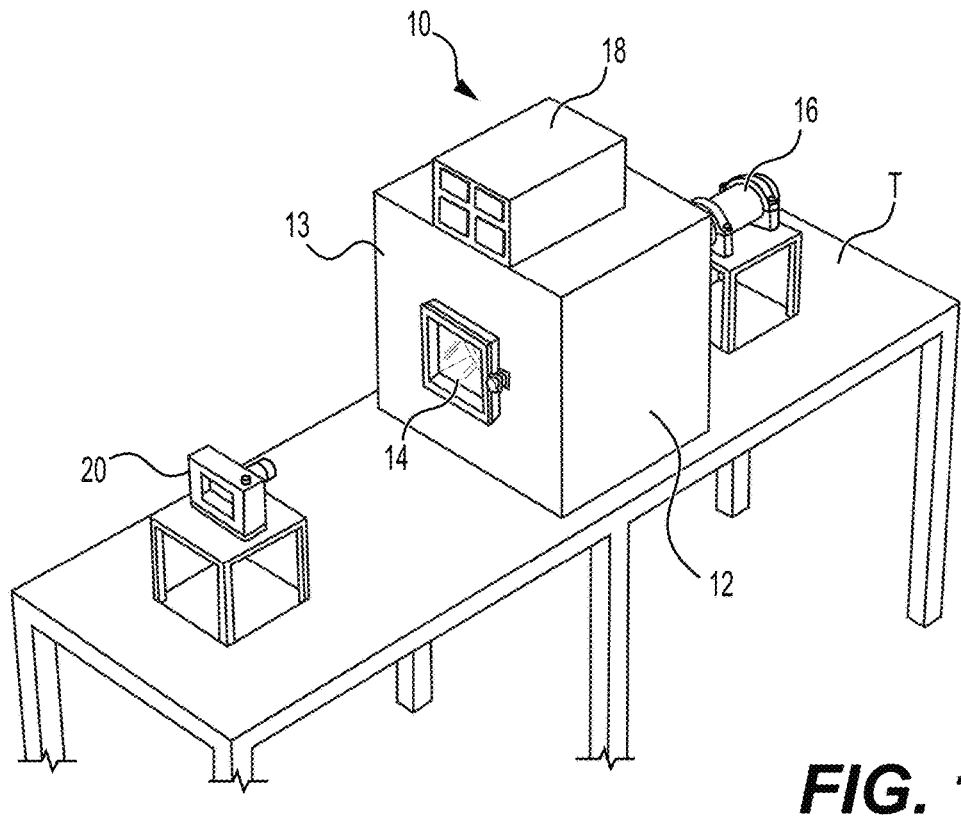
FIG. 1A is a perspective view of the system for measuring the angle of repose of high temperature granular material.
Figure 1B:
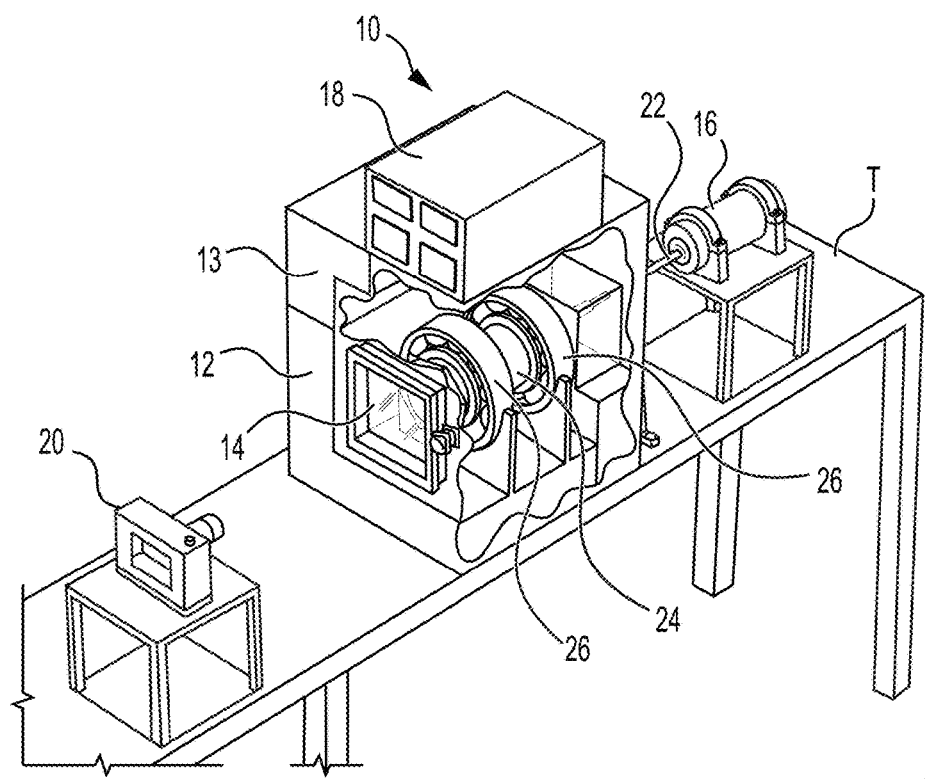
FIG. 1B is a partially cut-away, perspective view of the system for measuring the angle of repose of high temperature granular material.
Figure 4:
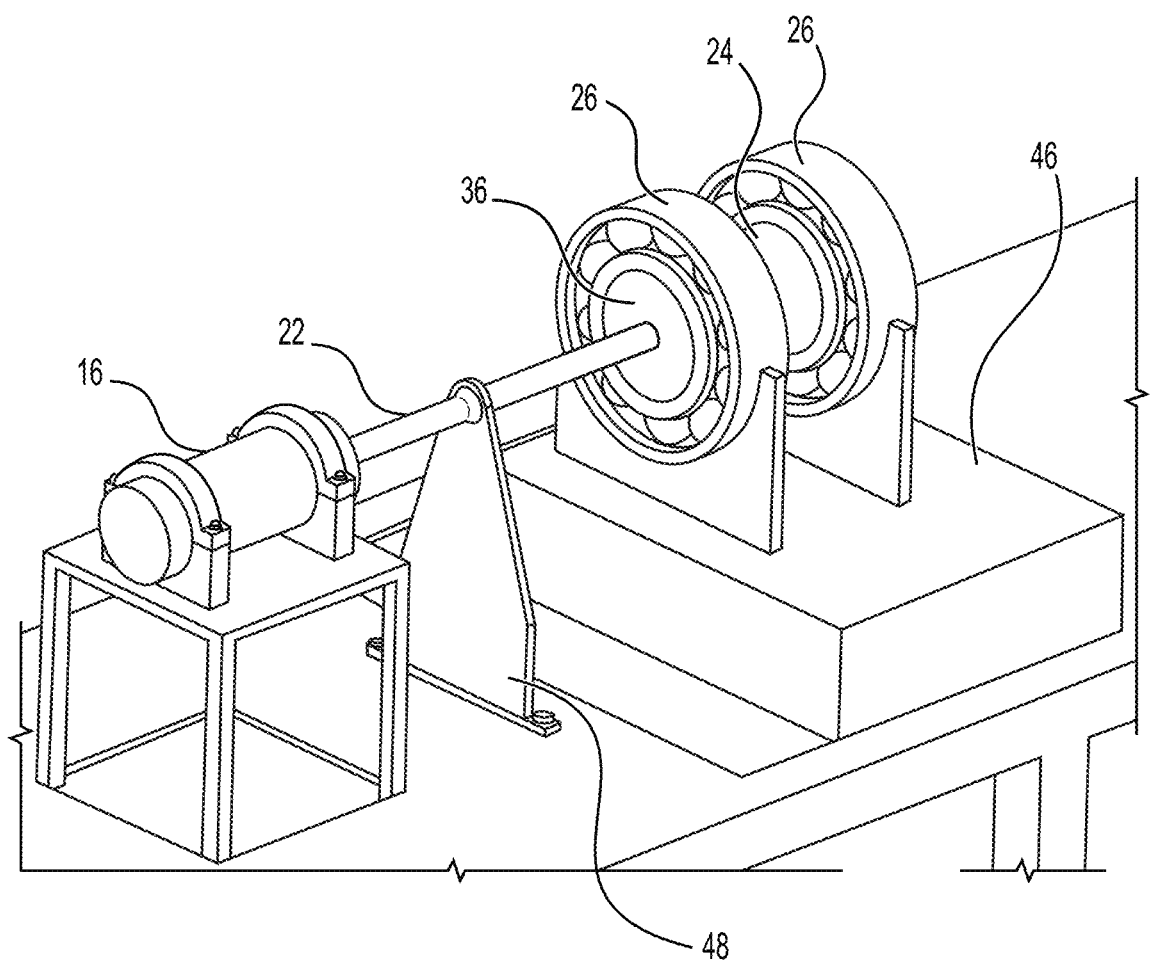
FIG. 4 is a partial perspective view of the system for measuring the angle of repose of high temperature granular material, shown without the hollow chamber for purposes of clarity and illustration.

Referring now to FIGS. 1A and 1B, the system for measuring the angle of repose of high temperature granular material 10 includes a hollow chamber 12 having at least one sidewall 13 with an optically transparent window 14 mounted therein. Although the hollow chamber 12 is shown as having a substantially cubical shape, it should be understood that the particular shape and relative dimensions of hollow chamber 12 are shown for exemplary purposes only and may be varied. As shown in FIGS. 1B and 4, a cylindrical receptacle 24 is rotatably mounted within the hollow chamber 12. As best shown in FIG. 4, the cylindrical receptacle 24 may be mounted on bearings 26, allowing the cylindrical receptacle 24 to rotate with respect to hollow chamber 12. It should be understood that the pair of ball bearings 26 shown in FIGS. 1B and 4 are shown for exemplary purposes only and that any suitable type and number of bearings or other suitable types of rotational mounts may be used for the rotatable mounting and support of cylindrical receptacle 24. Bearings 26 may be selected such that the cylindrical receptacle 24 will be properly secured, remain horizontally level, and have any vibrations damped during rotation and measurement.

Further, as shown in FIG. 4, the bearings 26 may be mounted on a platform 46 which is positioned within the hollow chamber 12. The platform 46 allows the cylindrical receptacle 24 to be positioned at a desired height which, in a particular embodiment, is aligned with the optically transparent window 14. It should be understood that the shape and relative dimensions of platform 46 are shown for exemplary purposes only. Returning to FIGS. 1A and 1B, the system for measuring the angle of repose of high temperature granular material 10 is shown mounted on an exemplary table T. It should be understood that table T is shown for exemplary purposes only and that the system for measuring the angle of repose of high temperature granular material 10 may be mounted on any suitable level surface.

Figure 2:
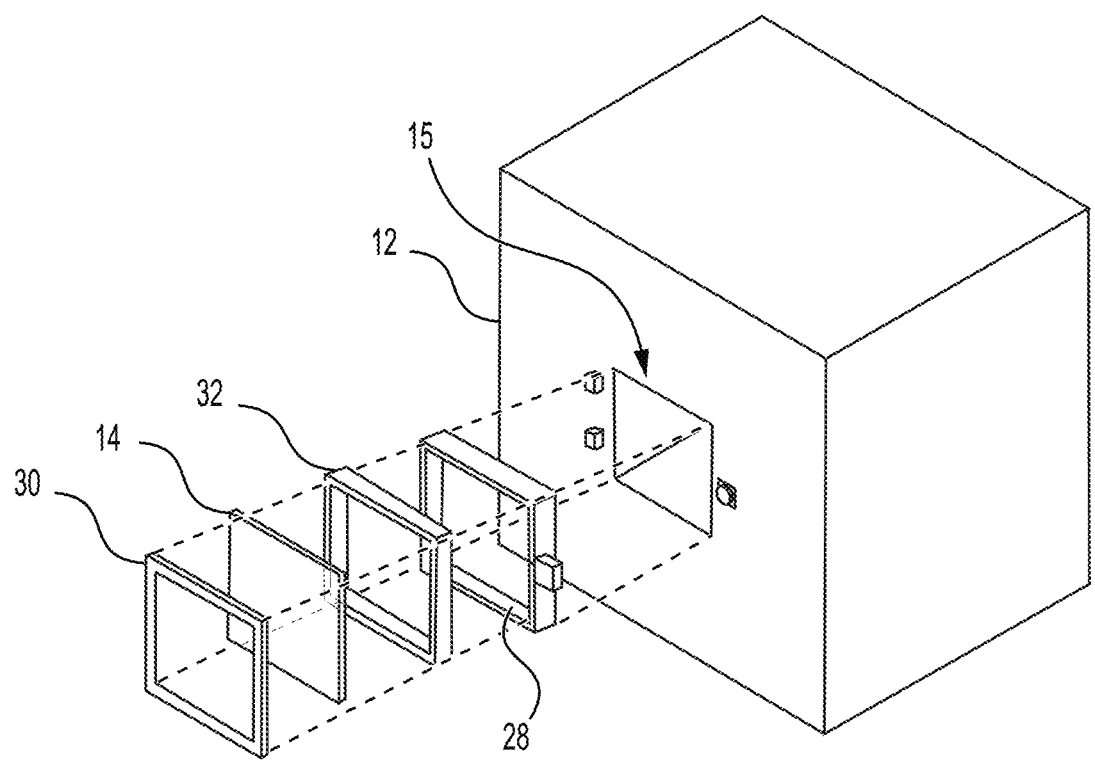
FIG. 2 is an exploded perspective view of a hollow chamber of the system for measuring the angle of repose of high temperature granular material.

As shown in FIG. 2, the optically transparent window 14 may be mounted between a pair of gate frames 28, 30, allowing the optically transparent window 14 to be opened and/or removed from covering opening 15 formed through the at least one sidewall 13. An additional frame 32 formed of thermally insulating material may be positioned about the periphery of the optically transparent window 14, as shown. It should be understood that the optically transparent window 14 may be formed of any suitable material. As a non-limiting example, the optically transparent window 14 may be formed from a high refractory transparent glass, such as quartz.

Figure 3:
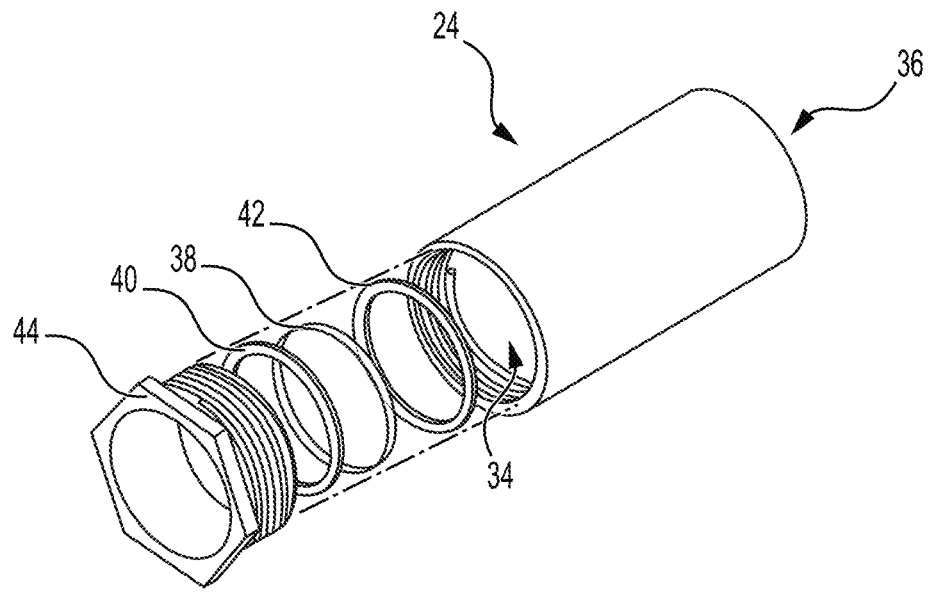
FIG. 3 is an exploded perspective view of a cylindrical receptacle of the system for measuring the angle of repose of high temperature granular material.

As best shown in FIG. 3, the cylindrical receptacle 24 has opposed open and closed ends 34, 36, respectively, with the open end 34 being releasably covered by an optically transparent plate 38. The cylindrical receptacle 24 is adapted for receiving a volume of granular material and, as shown in FIG. 1B, the cylindrical receptacle 24 is oriented with respect to the hollow chamber 12 such that the optically transparent plate 38 faces, and is aligned with, the optically transparent window 14. As shown in FIG. 3, in order to properly hold the optically transparent plate 38 in place, and in order to form a seal around the optically transparent plate 38 such that the granular material does not escape, the circumferential edge of the optically transparent plate 38 may be sandwiched between a pair of gaskets 40, 42. Gaskets 40, 42 are preferably formed from a material capable of withstanding high temperatures and of preventing thermal expansion of the cylinder wall from damaging the optically transparent plate 38.

The open end 34 of the cylindrical receptacle 24 may be releasably sealed by a cap 44, with the optically transparent plate 38 mounted therein. It should be understood that the optically transparent plate 38 may be formed of any suitable material. As a non-limiting example, the optically transparent plate 38 may be formed from a high refractory transparent glass, such as quartz. It should be understood that the cylindrical receptacle 24 may be formed from any suitable material capable of withstanding high temperatures, such as, but not limited to, ceramic, quartz or stainless steel alloys. It should be further understood that cap 44 may be formed of similar materials. Additionally, it should be understood that the shape and relative dimensions of cap 44 are shown for exemplary purposes only. Further, it should be understood that the threaded connection shown in cap 44 is shown for exemplary purposes only and that cap 44 may releasably cover open end 34 using any suitable type of releasable attachment.

As shown in FIGS. 1B and 4, the cylindrical receptacle 24 is controllably rotated within the hollow chamber 12 by a motor 16 or the like. It should be understood that motor 16 is shown for exemplary purposes only and may be replaced by any suitable device for driving rotational motion, such as a rotational actuator or the like. The motor 16 may be mounted external to the hollow chamber 12, as shown, and an axle 22 may be coupled to the motor 16 and the closed end 36 of the cylindrical receptacle 24 such that driven rotation of the axle 22 by the motor 16 drives rotation of the cylindrical receptacle 24. The axle 22 may pass through the at least one sidewall 13 of the hollow chamber 12. It should be understood that any suitable type of bearing or support, such as exemplary support 48 shown in FIG. 4, may be provided for supporting axle 22 and maintaining the alignment thereof. In addition to support 48, ball bearings 26 serve to prevent thermal bending of the axle 22 as a result of the weight of the cylindrical receptacle 24, particularly at high temperatures. Bearings 26 are preferably constructed from a material with a relatively high thermal resistance. The axle 22 is preferably formed from a relatively low thermal conductivity material in order to withstand high temperatures. Further, fins may be installed on the outer surface of the axle 22 to increase the heat transfer area, thus increasing heat dissipation before reaching the motor 16 (to prevent damage thereto). As a further alternative, a threaded shaft may be used as axle 22, with the threads acting as fins.

Figure 6:
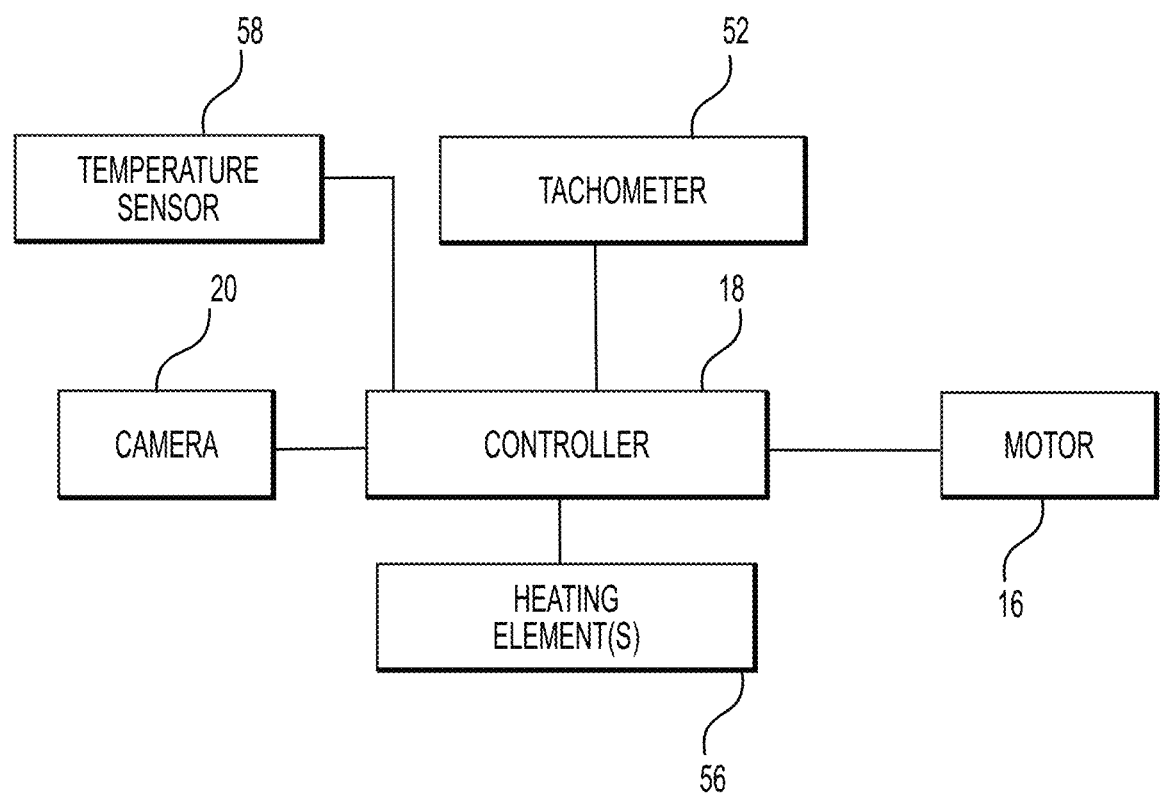
FIG. 6 is a block diagram illustrating measurement and control components of the system for measuring the angle of repose of high temperature granular material.

The temperature within the hollow chamber 12 may be selectively adjusted by one or more heating elements 56 mounted therein. As a non-limiting example, the one or more heating elements 56 may be of the type commonly found in laboratory furnaces. It should be understood that any suitable type of controllable heat source may be used to heat the interior temperature of the hollow chamber 12 to a desired temperature. As shown in FIG. 6, the one or more heating elements 56 are in communication with a controller 18, allowing for manual or programmable control over the temperature within the hollow chamber 12. It should be understood that controller 12 may be any suitable type of controller, such as a computer, a programmable logic controller, control circuitry, a processor or the like.

Figure 5:
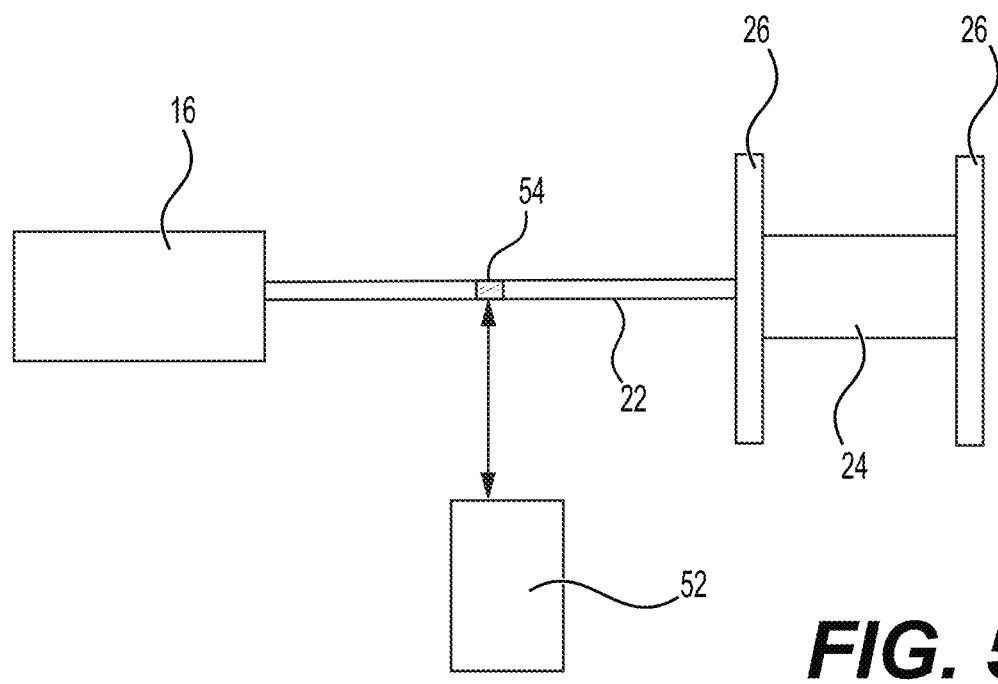
FIG. 5 is a top view of a rotational sub-system of the system for measuring the angle of repose of high temperature granular material.

A temperature sensor 58, such as a thermocouple or the like, may be provided for measuring the temperature within the hollow chamber 12 and providing temperature feedback to controller 18. Additionally, a rotational sensor 52, such as a non-contact tachometer or the like, may be provided for measuring the rotational speed of the cylindrical receptacle 24. The rotational sensor 52 may also be in communication with the controller 18 to provide rotational speed feedback thereto. It should be understood that any suitable type of rotational sensor and/or method of determining rotational speed may be used. As a non-limiting example, as shown in FIG. 5, a reflective marker 54 or the like may be fixed to the axle 22 and the non-contact tachometer 52 may, by measuring the frequency of detection of reflected light therefrom, determine the rotational speed of the axle 22 and the cylindrical receptacle 24. Controller 18 may include a voltage regulator or the like, or be in communication with a voltage regulator or the like, for providing control over the output of motor 16.

A camera 20 is mounted external to the hollow chamber 12 for detecting the angle of repose of the granular material when the cylindrical receptacle 24 is rotated within the hollow chamber 12. The camera 20 is positioned such that the granular material may be viewed thereby through the optically transparent plate 38 and the optically transparent window 14. It should be understood that any suitable type of camera or other image sensor may be used. As a non-limiting example, camera 20 may be a high-speed, high-resolution camera. The motor 16, camera 20, temperature sensor 58, rotational sensor 52 and the one or more heating elements 56 may each be in communication with the controller 18, allowing the user to control the operation and speed of the motor 16 (with or without automatic feedback-based control based on the measurements provided by the rotational sensor 52) and allowing the user to control the temperature within the hollow chamber 12 (with or without automatic feedback-based control based on the measurements provided by the temperature sensor 58). The controller 18 also receives and records the visual output from the camera 20, allowing the angle of repose of the granular material to be visually determined.

Controller 18 may be equipped with any suitable type of user interface, such as a touchscreen or the like. Via the interface, the user may activate the one or more heating elements 56 and set the desired temperature for the hollow chamber 12. The heating process may then be continued until steady-state heating conditions are attained. To achieve steady-state conditions, it may be necessary to allow the hollow chamber 12 to remain at the adjusted temperature for a period of time before taking any measurements.

As a non-limiting example of use, during rotation of the cylindrical receptacle 24, the granular materials within the cylindrical receptacle 24 move and rotate, reaching a maximum angle (i.e., the dynamic angle of repose). Camera 20 may record a video of the front face of the cylindrical receptacle 24 for each run of the measurement testing, typically lasting at least three minutes to ensure thorough distribution of the particulates along the cylinder. The final 20 seconds of the recorded video may then be extracted and divided into multiple frames captured at different time points. An image from one of these frames may then be copied and pasted into imaging software. An inclined line may then be drawn along the upper edge of the accumulated particles (on the image produced by the software), representing the slope angle of the dynamic angle of repose.

It is to be understood that the system for measuring the angle of repose of high temperature granular material is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A system for measuring an angle of repose of granular material, comprising:
    a hollow chamber having at least one sidewall with an optically transparent window mounted therein;
    a cylindrical receptacle rotatably mounted within the hollow chamber, wherein the cylindrical receptacle has opposed open and closed ends, the open end thereof being releasably covered by an optically transparent plate, the cylindrical receptacle being adapted for receiving a volume of granular material and the cylindrical receptacle being oriented with respect to the hollow chamber such that the optically transparent plate faces and is aligned with the optically transparent window;
    means for selectively rotating the cylindrical receptacle within the hollow chamber;
    means for selectively adjusting a temperature within the hollow chamber; and
    a camera for detecting an angle of repose of the granular material when the cylindrical receptacle is rotated within the hollow chamber, the camera being positioned external to the hollow chamber such that the granular material may be viewed by the camera through the optically transparent plate and the optically transparent window.

2. The system for measuring an angle of repose of granular material as recited in claim 1, wherein said means for selectively rotating the cylindrical receptacle comprises a motor.

3. The system for measuring an angle of repose of granular material as recited in claim 2, wherein the motor is located external to the hollow chamber.

4. The system for measuring an angle of repose of granular material as recited in claim 3, further comprising an axle coupled to the motor and the closed end of the cylindrical receptacle.

5. The system for measuring an angle of repose of granular material as recited in claim 1, further comprising a rotational sensor for measuring a rotational speed of the cylindrical receptacle.

6. The system for measuring an angle of repose of granular material as recited in claim 1, further comprising a temperature sensor for measuring the temperature within the hollow chamber.

7. The system for measuring an angle of repose of granular material as recited in claim 1, further comprising a cap for releasably sealing the open end of the cylindrical receptacle, the optically transparent plate being mounted in the cap.

8. The system for measuring an angle of repose of granular material as recited in claim 1, further comprising at least one bearing received within the hollow chamber for rotatable mounting of the cylindrical receptacle.

* * * * *